(12) United States Patent
Singer et al.

(10) Patent No.: US 7,832,768 B2
(45) Date of Patent: Nov. 16, 2010

(54) RETAINING SYSTEM WITH SEAT BELT RETRACTOR AND PRETENSIONER DEVICE

(75) Inventors: Klaus Peter Singer, Hamburg (DE); Jens Ehlers, Horst (DE)

(73) Assignee: Autoliv Development AB, Vargarda (SE)

( * ) Notice: Subject to any disclaimer, the term of this patent is extended or adjusted under 35 U.S.C. 154(b) by 81 days.

(21) Appl. No.: 12/090,585

(22) PCT Filed: Oct. 12, 2006

(86) PCT No.: PCT/EP2006/009843

§ 371 (c)(1),
(2), (4) Date: Oct. 16, 2008

(87) PCT Pub. No.: WO2007/045391

PCT Pub. Date: Apr. 26, 2007

(65) Prior Publication Data

US 2009/0218802 A1 Sep. 3, 2009

(30) Foreign Application Priority Data

Oct. 21, 2005 (DE) .................. 10 2005 050 426
Oct. 25, 2005 (DE) .................. 10 2005 051 042

(51) Int. Cl.
*B60R 22/36* (2006.01)
(52) U.S. Cl. .............. 280/806; 297/479; 297/480
(58) Field of Classification Search ........... 280/806; 297/480, 479

See application file for complete search history.

(56) References Cited

U.S. PATENT DOCUMENTS

| | | | | |
|---|---|---|---|---|
| 4,116,295 A | * | 9/1978 | Booth | 180/268 |
| 4,423,846 A | * | 1/1984 | Fohl | 242/374 |
| 4,750,686 A | * | 6/1988 | Fohl | 242/374 |
| 4,790,561 A | * | 12/1988 | Brown | 280/806 |
| 4,925,123 A | * | 5/1990 | Frei et al. | 242/374 |
| 5,160,168 A | * | 11/1992 | Nishizawa et al. | 280/806 |
| 5,190,239 A | * | 3/1993 | Yoshida et al. | 242/374 |
| 5,337,970 A | * | 8/1994 | Imai et al. | 242/374 |
| 5,522,564 A | * | 6/1996 | Schmidt et al. | 242/374 |
| 5,743,481 A | * | 4/1998 | Baker | 242/374 |
| 5,906,328 A | * | 5/1999 | Hamaue et al. | 242/374 |
| 5,984,223 A | * | 11/1999 | Hiramatsu | 242/379.1 |

(Continued)

FOREIGN PATENT DOCUMENTS

DE 3600004 A1 * 7/1987

(Continued)

*Primary Examiner*—Paul N Dickson
*Assistant Examiner*—Nicole Verley
(74) *Attorney, Agent, or Firm*—Brinks Hofer Gilson & Lione

(57) ABSTRACT

A restraining system for a motor vehicle with a seat belt retractor that accommodates the one end of a seatbelt component, which has a tightening device having a belt shaft and a drive cable connected to the belt shaft, in which a sleeve (26) that enlarges the outer circumference of the shaft element (25) is slid onto one end of the shaft element (25) and is axially and radially fixed to the shaft element (25), while the wall thickness of the sleeve (26) is dimensioned in such a way that the drive radius of the shaft element (25) and a reduction in speed of the tightening drive is provided as compared with a cable wrapped onto the belt shaft.

19 Claims, 4 Drawing Sheets

U.S. PATENT DOCUMENTS

| | | | |
|---|---|---|---|
| 6,302,346 B1 * | 10/2001 | Brown et al. | 242/379.1 |
| 6,460,935 B1 * | 10/2002 | Rees et al. | 297/478 |
| 6,871,877 B2 * | 3/2005 | Herrmann et al. | 280/805 |
| 7,097,206 B2 * | 8/2006 | Walenta | 280/806 |
| 7,566,021 B2 * | 7/2009 | Singer | 242/382.2 |
| 7,584,997 B2 * | 9/2009 | Bachmann et al. | 280/801.1 |
| 2003/0047931 A1 * | 3/2003 | Rees et al. | 280/806 |

FOREIGN PATENT DOCUMENTS

| | | |
|---|---|---|
| DE | G 91 04 917.2 | 10/1991 |
| DE | 4331027 A1 * | 3/1995 |
| DE | 103 04 943 B3 | 10/2004 |
| DE | 103 48 461 A1 | 5/2005 |
| JP | 05254393 A * | 10/1993 |
| JP | 07047923 A * | 2/1995 |
| WO | WO 8701997 A1 * | 4/1987 |
| WO | WO 90/11913 | 10/1990 |
| WO | WO 2004/069614 A1 | 8/2004 |

* cited by examiner

RETAINING SYSTEM WITH SEAT BELT RETRACTOR AND PRETENSIONER DEVICE

CROSS REFERENCE TO RELATED APPLICATIONS

This application claims priority to German patent application Nos. DE 10 2005 050 426.4, filed Oct. 21, 2005, DE 10 2005 051 042.6, filed Oct. 25, 2005, and PCT/EP2006/009843, filed Oct. 12, 2006.

FIELD OF THE INVENTION

The invention relates to a retention system for a motor vehicle with a seat belt retractor accommodating one end of a seatbelt component which has a belt shaft and a pretensioner device having a drive connection with the belt shaft.

BACKGROUND OF THE INVENTION

A restraining system of the aforementioned type is described, for example, in DE 103 04 943 B3. With the known restraining system, the associated seat belt retractor is part of an end fitting pretensioner in which the end of the seat belt to be fixed on the motor vehicle structure is fixed on the retractor shaft, so that this end of the seatbelt is wound up on the shaft upon actuation of the pretensioner drive and is tightened in this way. The locking of the shaft element with the seat belt retractor housing is undertaken in such a way that the locking element is arranged in the radial interior of the shaft element, which has a hollow configuration, and is pretensioned by means of a passage opening configured in the shaft element by spring action over the outer circumference of the shaft element until it engages in the associated gearing of the housing leg that supports the belt shaft. Consequently, the locking element is in a permanent locking with the seat belt retractor housing so that the end of the seat belt is correspondingly fixed and therewith fixedly mounted on the motor vehicle. When the pretensioner drive is activated, the locking element ratchets away through the gearing of the housing leg in the corresponding direction of the belt shaft, while in the event of a rotation of the belt shaft in the belt withdrawal direction after completing the pretensioning rotation, the immediate locking of the belt shaft takes place.

It is an object of the invention to increase the pretensioning force of a restraining system of the type described above.

This object, including the advantageous embodiments and further developments of the invention, is attained with the features of the present invention described herein.

SUMMARY OF THE INVENTION

The invention provides in its basic conception to slide a sleeve, which enlarges the outer circumference of the shaft element in this area and is immovably axially and radially connected to the shaft element, on one end of the shaft element, in which the thickness of the wall of the sleeve is dimensioned in such a way that the drive radius of the shaft element is enlarged and a reduction in speed of the pretensioner drive is established as compared with wrapping the pretensioner cable directly onto the shaft element. Due to the arrangement of the sleeve, the tightening radius and therewith the tightening force are enlarged when the diameter of the shaft element, and therefore the winding radius of the wound-up belt webbing, remain constant because the drive cable is wound around the sleeve at a greater radial distance with respect to the central axis of the shaft element.

According to an exemplary embodiment of the invention, the belt shaft is configured as a hollow shaft with a locking element arranged in the interior of the shaft element, as is known from the prior technology as described by DE 103 04 943 B3, in which the sleeve is slid on the end that accommodates the locking element and is mounted in the housing leg, and has an opening that is flush with the passage opening of the shaft element for the locking element.

According to exemplary embodiments of the invention, it can be provided with respect to mounting of the drive cable on the belt shaft, that the drive cable extends through the sleeve and is mounted on the shaft element, or that the drive cable is mounted directly on the sleeve. It can also be provided that the drive cable is mounted both on the shaft element and the sleeve.

To the extent that a supporting of the locking element on the shaft element is to be ensured for transferring load from the belt shaft to the seat belt retractor housing, the locking element can be supported in the engaged state with the gearing of the housing leg on an edge region of the passage opening of the shaft element, which is configured as a nose.

As an alternative, the locking element can be braced in the engaged state with the gearing of the housing leg at an edge region of the opening configured in the sleeve, which is configured as a nose.

An especially secure force transmission results according to one embodiment of the invention when the locking element is braced in the engaged state with the gearing of the housing leg on the edge of the passage opening of the shaft element as well as the opening configured in the sleeve, which is configured as a joint nose.

With regard to the radial and axial fixation of the sleeve on the shaft element, it can be provided according to an exemplary embodiment of the invention that the connection of the sleeve and the shaft element is created by means of projections stamped out of the sleeve radially inward extending into associated recesses of the shaft element.

As long as the projections of the sleeve are inclined in axial direction of the shaft element, it is practical to arrange two projections with an opposite oriented inclination.

The force transmission is improved overall as long as, according to an exemplary embodiment of the invention, a multitude of recesses and projections are distributed over the circumference of the shaft element and the sleeve.

In a further embodiment of the invention, it is provided that two annular closed retaining elements with a smooth internal circumference enclosing the housing leg as well as the deflected locking element between them are slid on the shaft element for axial position securing of the belt shaft on the housing leg lockingly interacting with the locking element, in which the shaft element has a stop for the axial fixation of the internal retaining element, which comes to lie between the stop and the housing leg, and the outer sleeve lying outwardly against the housing leg as a further retaining element is fixed using an anti-sliding safety on the shaft element. The advantage that due to the axial shaft fixing device, an axial displacement of the belt shaft relative to the retractor housing is ruled out, especially due to the action of the tightening device coupled to the belt shaft. An axial shaft fixing device such as this is basically known from the generic restraining system disclosed in DE 103 48 461 A1.

As long as according to an exemplary embodiment of the invention it is provided that the stop provided on the shaft body is formed by stamping the shaft element as a radial elevation of the circumference of the shaft element, the advantage that the stop can be economically manufactured without an additional component is provided.

In accordance with a further exemplary embodiment of the invention, it is provided that the inner retaining element is configured as a retaining ring which can be slid on the shaft element, and the outer retaining element is configured as a sleeve which can be slid against the housing leg on the retaining element, while the drive cable is wound on the outer circumference of the sleeve. In this case, it can be provided that the anti-sliding safety for the sleeve consists of a cable suspension configured at the end of the drive cable, which passes through the sleeve as well as the shaft element of one opening in each case. The advantage that the anti-sliding safety is likewise realized without an additional component is associated with this.

According to an exemplary embodiment of the invention, it is provided that the retaining elements are provided in each case at their front end that faces the housing leg with an axial facet, in such a way that a linear installation of the retaining element on the housing leg results. In this way, friction losses due to the rotation of the belt shaft are minimized. It can moreover be provided that the facet of the retaining elements in each case bridges the opening configured in the shaft element for penetration of the toothed lock washer.

BRIEF DESCRIPTION OF THE DRAWINGS

In the drawings are depicted exemplary embodiments of the invention, which will be described in the following, and wherein.

DETAILED DESCRIPTION OF THE INVENTION

Figure 1:
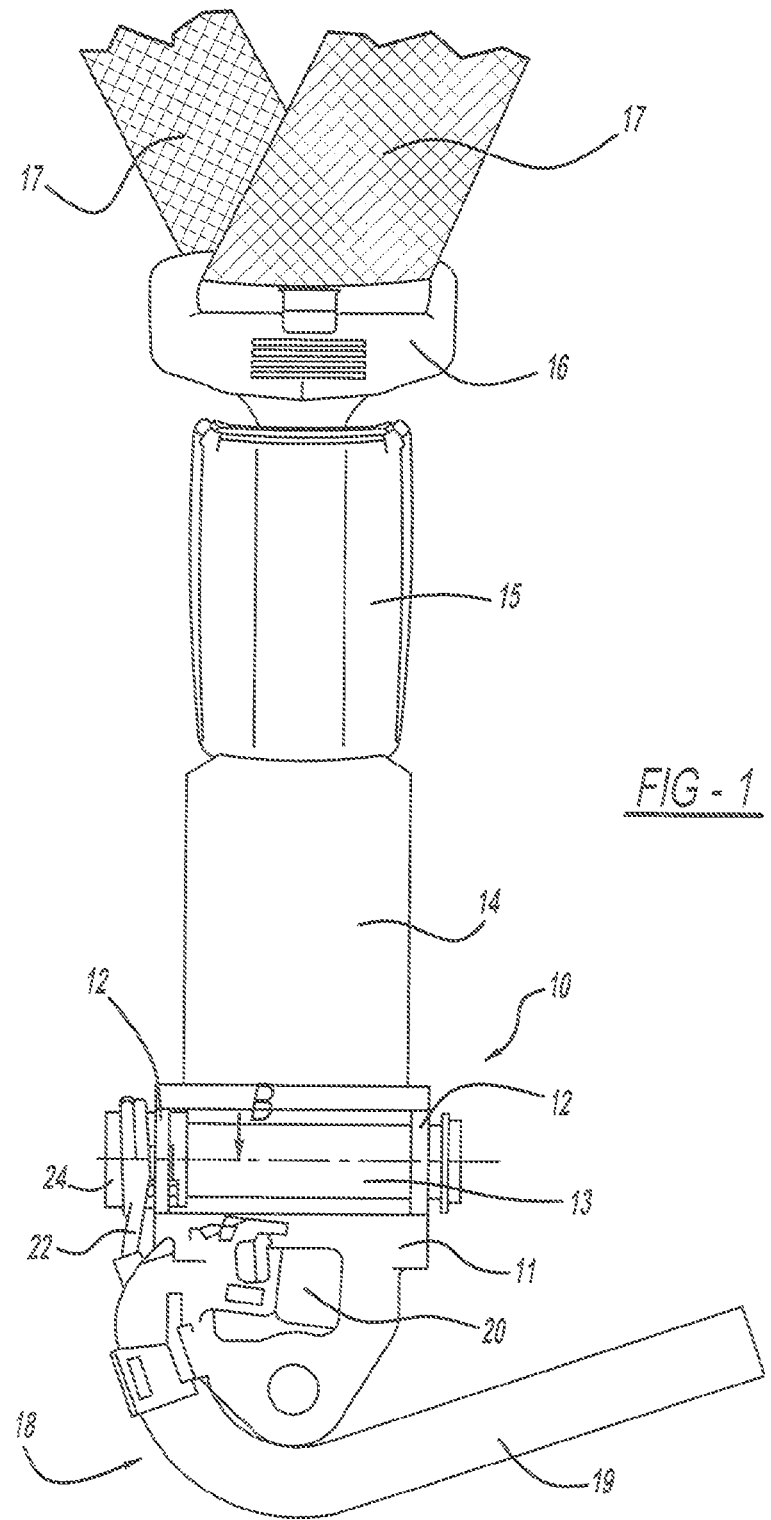
FIG. 1 illustrates an overall view of a seat belt retractor and pretensioning device in accordance with the present invention.

The seat belt retractor and a pretensioning device 10 in accordance with this invention, which can be seen in FIG. 1, the seat belt retractor consists of a U-shaped seat belt retractor housing 11, in whose housing legs 12 a belt spool or shaft 13 is mounted, on which a belt webbing 14 is wound. A belt buckle 15 is mounted on the free end of the belt webbing 14, into which or from which a locking tongue 16 can be inserted or detached, wherein the locking latch plate tongue 16 is mounted on a seat belt 17. Seat belt arrangements such as that described above are known. In order to be able to subject the belt buckle 15 to a tightening by winding up the belt webbing 14 on the belt shaft 13, a pretensioning device 18 is fastened on a housing leg 12 consisting of a pretensioner tube 19 and a gas generator receptacle 20. The connection between the pretensioning device 18 and the belt shaft 13 is carried out by means of a drive wire or cable 22, which is wound on a shaft extension 24 of the belt shaft 13 and its end is affixed to the shaft.

Figure 2:
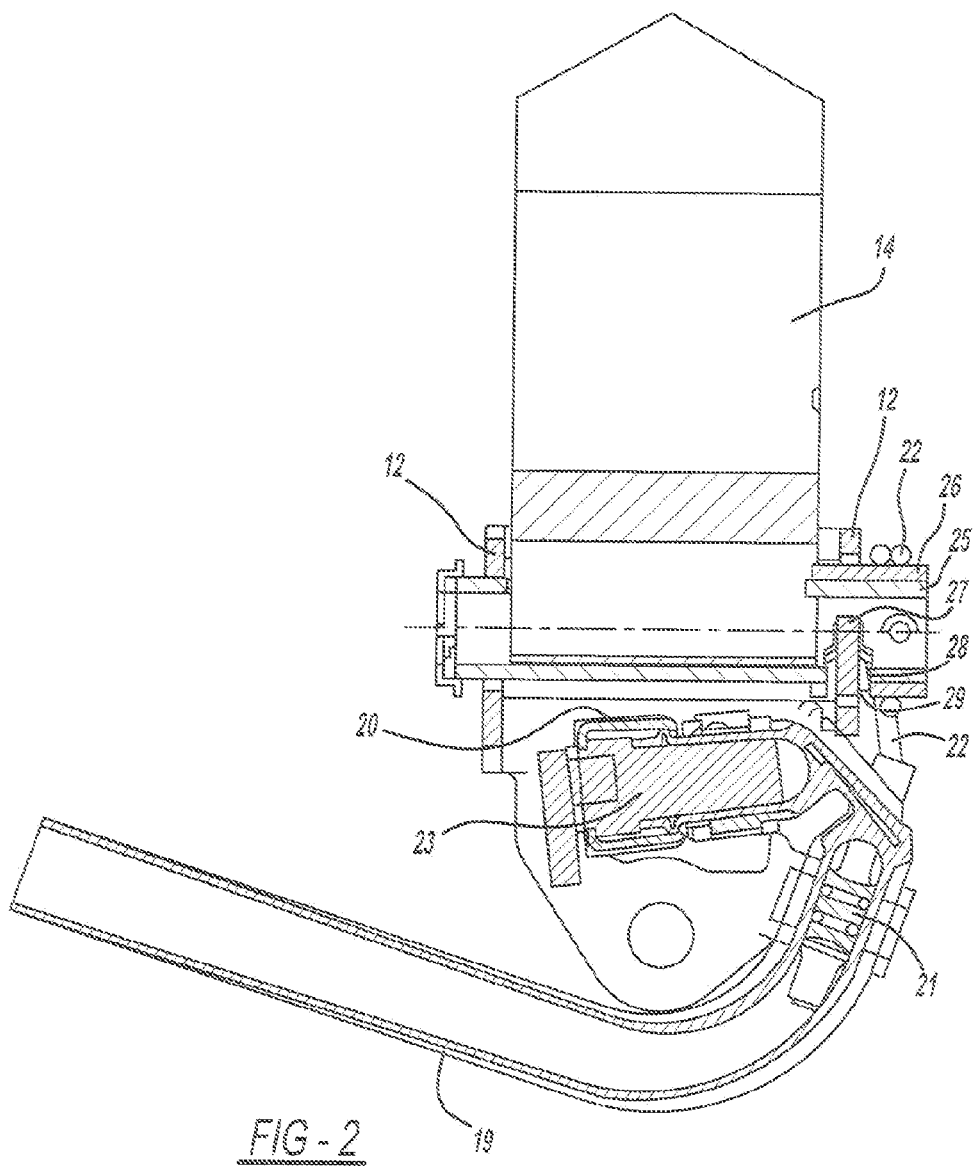
FIG. 2 illustrates the device shown in FIG. 1 in a side view.

As can also be seen in FIG. 2, the end of the drive cable 22 attached to the pretensioning device 18 is guided into the pretensioner tube 19 and is connected herein to a piston 21, which can move within the tightening tube 19. A gas generator 23 is arranged in the gas generator receptacle 20 of the pretensioner tube 19, which upon activation releases gas, which drives the piston 21 in the pretensioner tube 19, so that the drive cable 22 is unwound from the shaft extension 24 of the belt shaft 13 and consequently causes the belt shaft 13 to rotate which tightens or pretensions webbing 14.

The belt shaft 13 has a shaft element 25, which has a hollow configuration, on which the belt webbing 14 is wound. A locking element 27, which passes with at least one tooth through a passage opening 28 arranged in the shaft element 25, is arranged within the plane of the housing leg 12 in the shaft element 25, through which passes the shaft extension 24. A sleeve 26 on whose outer circumference the drive cable 22 is wound, is slid on the shaft extension 24, which overlaps the shaft extension 24 in order to enlarge the tightening radius. The sleeve 26 has an opening 29 for the passage of the locking element 27, which is flush with the passage opening 28 of the shaft element 25, so that the locking element engages with the allocated gearing of the housing leg 12 when it is pivoted out into its locking position. As is not shown in detail, the locking element 27, according to the description of DE 103 04 943 B3, which is herewith also being made into an object of the present disclosure, is pretensioned by a spring element into its pivoted out locking position, so that the locking element 27 ratchets away over the gearing of the housing leg 12 when the belt shaft 13 is rotated, and brings about the immediate locking of the belt shaft 13 in the belt withdrawal direction when the belt shaft 13 is rotated after the pretensioning rotation has ended.

Figure 3:
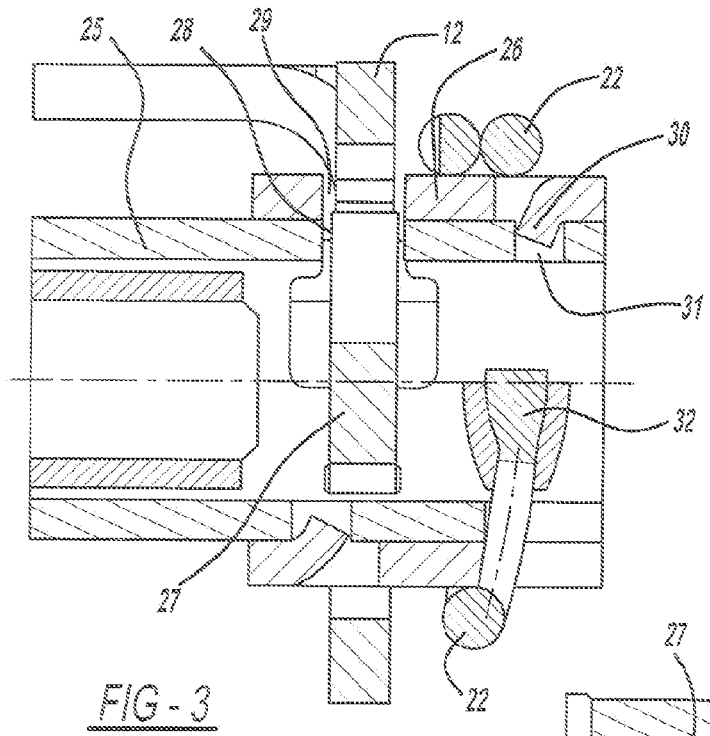
FIG. 3 illustrates the latching element of the seat belt retractor shown in FIG. 1.

As can be inferred in more detail from FIG. 3, the sleeve 26 is axially and radially fixedly mounted on the shaft element 25, in that projections 30 are stamped in the plane of the shaft element 25, which project from the sleeve 26 radially inwardly, which in turn engage into recesses 31 formed in the sleeve 26. Two diametrically opposite projections 30 engaging with recesses 31 are represented in the shown exemplary embodiment, in which the projections 30 are aligned inclined in the axial direction of the shaft element 25 in such a way that their longitudinal axis intersects the longitudinal axis of the shaft element 25. The mutually opposite projections 30 are preferably arranged therein with an opposite oriented inclination, so that the sleeve 26 is axially and radially immovably fixed on the shaft element 25. In FIG. 3 can furthermore be seen a cable end fitting or bushing 32 for the drive cable 22, which in the shown exemplary embodiment is positioned in the interior of the shaft element 25, so that the drive cable 22 runs toward its outer circumference through a corresponding clearance in the sleeve 26.

Figure 4:
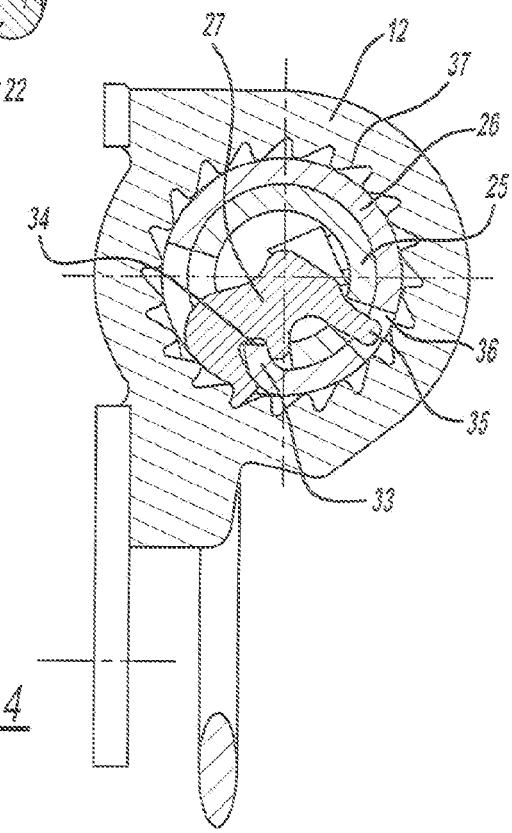
FIG. 4 illustrates the latching plane of the seat belt retractor in accordance with this invention shown in section.

In FIG. 4 can finally be seen the arrangement and mounting of the locking element 27 in the hollow shaft element 25, which corresponds to the description in the representative DE 103 04 943 B3. Here, the locking element 27, which is mounted with a bearing arrangement 35 in a perforation 36 formed in the shaft element 25 as well as in the sleeve 26, respectively, is supported when engaged with the gearing 37 of the allocated housing leg 12, on an edge region of the opening 29 of the sleeve 26, which is configured as an inwardly curved nose 33 that engages in a pocket 34 formed in the locking element 27. Consequently, the introduction of the bracing force is carried out, on the one hand, into the sleeve 26, and on the other hand, via the bearing attachment 35 into the sleeve 26 as well as into the shaft element 25.

Figure 5:
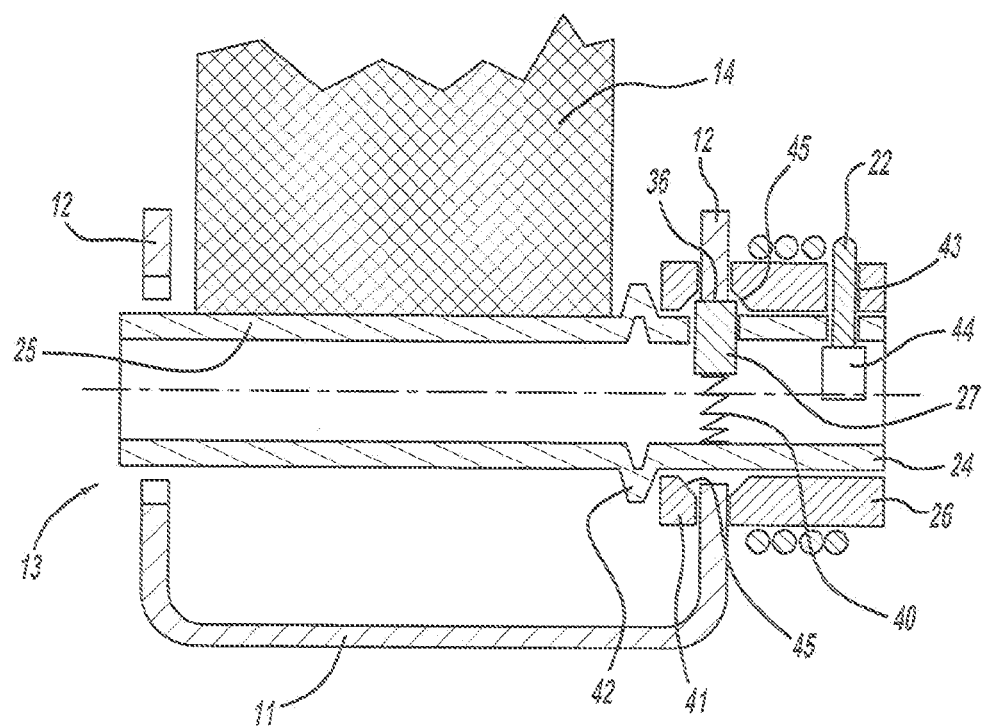
FIG. 5 illustrates an exemplary embodiment of the belt shaft with an axial locking device in section view.

As can be seen in FIG. 5, the axial locking device of the belt shaft 13 is positioned on the housing leg 12 that interacts with the locking element 27, and namely through an internal retaining element 41 slid on the shaft element 25, which is configured, with the exception of the passage opening 28, with a closed circumference. The internal retaining element 41 is located in the interior of the housing frame 11 between the housing legs 12 and is configured as a closed retaining ring, which is supported on a stop 42 configured by stamping or forming of the shaft element 25. The sleeve 26, on whose outer circumference the drive cable 22 is wound, is slid on the outside of the shaft extension 24, which projects beyond the housing leg 12. The drive element, which is provided at its end with a cable fitting 44, is guided into the interior of the shaft element through an opening 43 formed in the sleeve 26 as well as in the shaft element 25 and is fixed by means of the cable fitting 44. Due to this configuration, the cable fitting 44 together with the drive cable 22 extending from it acts at the same time as an anti-sliding safety for the external sleeve 26, so that after the installation is complete, the sleeve is immovably fixed on the shaft element 25.

In order to reduce friction losses during the rotation of the belt shaft 13, the internal retaining element 41 as well as the external sleeve 26 are provided with a radial facet 45 which respectively face the housing leg 12, so that a basically linear installation of the two retaining elements 41 or 26 on the housing leg 12 is achieved. Here, the facet 45 is formed in such a way that the passage opening 28, which is configured in the shaft element 25 to allow the passage of the locking element 27, is bridged in each case.

The features of object of these documents, which are disclosed in the previous description, the patent claims, the abstract, and the drawings, can be essential individually and also in any desired combinations for the realization of the invention in its various embodiments.

The invention claimed is:

1. A restraining system for a motor vehicle comprising a seat belt retractor for fixing a seatbelt component, which has a belt shaft element and a pretensioner device attached to the belt shaft element having a drive cable which is tensioned by a piston upon actuation, a sleeve that enlarges the outer circumference of the belt shaft element is slid on one end of the belt shaft element and is axially and radially fixed to the shaft element, wherein the wall thickness of the sleeve provides a drive radius of the cable wrapped on the sleeve which is greater than the radius of the belt shaft element, wherein the belt shaft element is configured as a hollow shaft with a locking element arranged in the interior of the shaft element, and the sleeve is slid on the end of the shaft element that accommodates the locking element, which is mounted in a retractor housing leg, and has an opening, which is flush with a passage opening of the shaft element of the locking element.

2. The restraining system according to claim 1, the drive cable is fixed on the sleeve.

3. The restraining system according to claim 1, wherein the drive cable is jointly mounted on the belt shaft element and on the sleeve.

4. The restraining system according to claim 1, wherein the locking element is supported with a gearing of the housing leg on a nose-shaped edge region of the passage opening of the shaft element.

5. The restraining system according to claim 1, wherein the locking element, when it is engaged, is supported with a gearing of the housing leg on an edge region of the opening formed in the sleeve, which is configured as a nose.

6. The restraining system according to claim 1, wherein the locking element, when it is engaged, is supported with a gearing of the housing leg on an edge region of the passage opening of the shaft element as well as on an opening formed in the sleeve, which is configured as a nose.

7. The restraining system according to claim 1, wherein the pretensioner device is mounted to a belt buckle.

8. The restraining system according to claim 1, wherein the seat belt retractor is affixed to an end of the seat belt.

9. The restraining system according to claim 1, wherein the connection of sleeve and the shaft element is provided by means of at least one stamped projection, with are oriented towards the interior of the sleeve in order to engage into an associated recesses of the shaft element.

10. The restraining system according to claim 9, wherein at least one projection of the sleeve is inclined in the axial direction of the shaft element.

11. The restraining system according to claim 9, wherein two projections are arranged with an opposite oriented inclination.

12. The restraining system according to claim 9, wherein a multitude of recesses and projections are provided distributed around the circumference of the shaft element and the sleeve.

13. The restraining system according to claim 1, wherein a retaining element and the sleeve each having a smooth internal circumference are slid on the shaft element for axially securing the shaft element on the housing leg, which lockingly interacts with the locking element as well as the locking element, when it is pivoted out, is slid on the shaft element between the retaining element and the sleeve, while the shaft element has a stop for the axial fixation of the retaining element which comes to rest between the stop and the housing leg, and the outer sleeve is further fixed to the shaft element by the cable passing through cable openings.

14. The restraining system according to claim 13, wherein the stop provided on the shaft element is formed by stamping the shaft element as a radial projection of the circumference of the shaft element.

15. The restraining system according to claim 13, wherein the internal retaining element is configured as a retaining ring, which can be slid on the shaft element, and the sleeve, can be slid on the shaft extension against the housing leg, while the drive cable is wound on the outer circumference of the sleeve.

16. The restraining system according to claim 15 having an anti-sliding safety for the sleeve, the anti-sliding safety consists of a cable fitting, which is configured at the end of the drive cable, and which passes through openings in the sleeve as well as the shaft element.

17. The restraining system according to claim 13, wherein the retaining elements and the sleeve are provided with an axial facet at their front ends, which face the housing leg, respectively, in such a way that a linear installation of the retaining element in its circumferential direction on the housing leg is obtained.

18. The restraining system according to claim 17, wherein the facet of the retaining elements or the sleeve bridges the passage opening formed in the shaft element to allow the passage of the locking element.

19. A restraining system for a motor vehicle comprising a seat belt retractor for fixing a seatbelt component, which has a belt shaft element and a pretensioner device attached to the belt shaft element having a drive cable which is tensioned by a piston upon actuation, a sleeve that enlarges the outer circumference of the belt shaft element is slid on one end of the belt shaft element and is axially and radially fixed to the shaft element, wherein the wall thickness of the sleeve provides a drive radius of the cable wrapped on the sleeve which is greater than the radius of the belt shaft element, wherein the drive cable passes through the sleeve and is mounted on the belt shaft element.

* * * * *